(12) United States Patent
Antonsson

(10) Patent No.: US 11,991,022 B2
(45) Date of Patent: May 21, 2024

(54) MONITORING CONTROLLER AREA NETWORK (CAN) XL NODES

(71) Applicant: Volvo Car Corporation, Gothenburg (SE)

(72) Inventor: Anders Bertil Antonsson, Västra Frölunda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 48 days.

(21) Appl. No.: 17/324,779

(22) Filed: May 19, 2021

(65) Prior Publication Data
US 2022/0376947 A1 Nov. 24, 2022

(51) Int. Cl.
*H04L 12/40* (2006.01)
*H04L 41/0803* (2022.01)

(52) U.S. Cl.
CPC .......... *H04L 12/40* (2013.01); *H04L 41/0803* (2013.01); *H04L 2012/40215* (2013.01)

(58) Field of Classification Search
CPC ................. H04L 12/40; H04L 41/0803; H04L 2012/40215
See application file for complete search history.

(56) References Cited

U.S. PATENT DOCUMENTS

| 2020/0136965 A1* | 4/2020 | Gray | H04L 49/1546 |
|---|---|---|---|
| 2020/0382340 A1 | 12/2020 | Muth | |
| 2021/0001788 A1 | 1/2021 | de Haas | |
| 2021/0226661 A1* | 7/2021 | de Haas | H04B 1/40 |
| 2021/0374083 A1* | 12/2021 | de Haas | H04L 12/40013 |
| 2022/0286320 A1 | 9/2022 | Mutter et al. | |

FOREIGN PATENT DOCUMENTS

| CN | 112019413 A | 12/2020 |
|---|---|---|
| CN | 112180775 A | 1/2021 |
| DE | 102018221680 A1 | 6/2020 |
| DE | 102019213783 A1 | 3/2021 |
| EP | 3691197 A1 | 1/2019 |
| EP | 3544239 A1 | 9/2019 |
| EP | 3700137 A1 | 8/2020 |
| WO | 2020120555 A1 | 6/2020 |

OTHER PUBLICATIONS

CAN in Automation | www.can-cia.org, last accessed on Apr. 7, 2021.
Vector | "CAN—Still Room for Improvement". Vo.1, Nov. 7, 2019, 24 pages.

(Continued)

*Primary Examiner* — Huy D Vu
*Assistant Examiner* — Robert Ma
(74) *Attorney, Agent, or Firm* — Amin, Turocy & Watson, LLP

(57) ABSTRACT

A method can comprise determining, by a device comprising a processor, a transceiver mode based on a first Controller Area Network (CAN) XL transceiver mode switch message received over a first receive data signal on a CAN XL network to a first transceiver, and in response to determining the transceiver mode, routing, by the device, a second CAN XL transceiver mode switch message over a second receive data signal to a second transceiver.

20 Claims, 13 Drawing Sheets

(56) References Cited

OTHER PUBLICATIONS

Lennartsson, K. | "CAN XL. The Next Generation of CAN". CAN in space workshop, Gothenburg, Jun. 13, 2019, 17 pages.
Bosch | "CAN XL. Next Step in CAN Evolution". Automotive Electronics, AE/EIY4, May 29, 2020, 13 pages.
CAN Newsletter Online | "Classical CAN, CAN FD, and CAN XL". Dec. 20, 2018, 2 pages.
CAN Newsletter Online | "Welcome CAN XL". Jan. 3, 2020, 3 pages.
Kvaser | CAN XL: Bridging the bitrate gap between CAN FD and Ethernet. Feb. 27, 2020, 4 pages.
CAN XL | The physical layer in the CAN XL world. CAN Newsletter Apr. 2020, 6 pages.
Bosch Semiconductors | Automotive IP modules. CAN XL. Next Step in CAN evolution. https://www.bosch-semiconductors.com/ip-modules/in-vehicle-communication-ip/can-ip-modules/can-xl/, last accessed on May 5, 2021.
Bosch | The next Step in CAN Evolution. Current Status of the CAN XL standardization @ CIA. Feb. 2021, 16 pages.
Bosch Semiconductors | CAN XL. Next Step in CAN evolution. https://web.archive.org/web/20200707212027/https://www.bosch-semiconductors.com/news/t-newsdetailpage-4.html, archived page, last accessed on May 7, 2021.
Extended EP Search Report for EP Application No. 22172764.7 dated Sep. 20, 2022.
Office Action received for Chinese Patent Application Serial No. 202210544413.0 dated Jun. 7, 2023, 7 pages (Original Copy Only).

\* cited by examiner

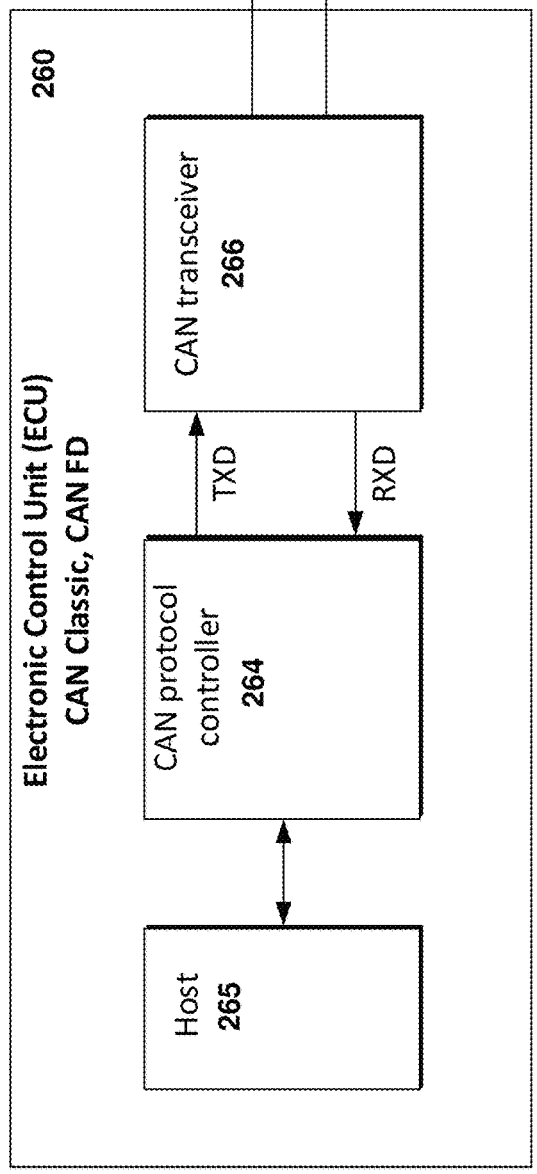
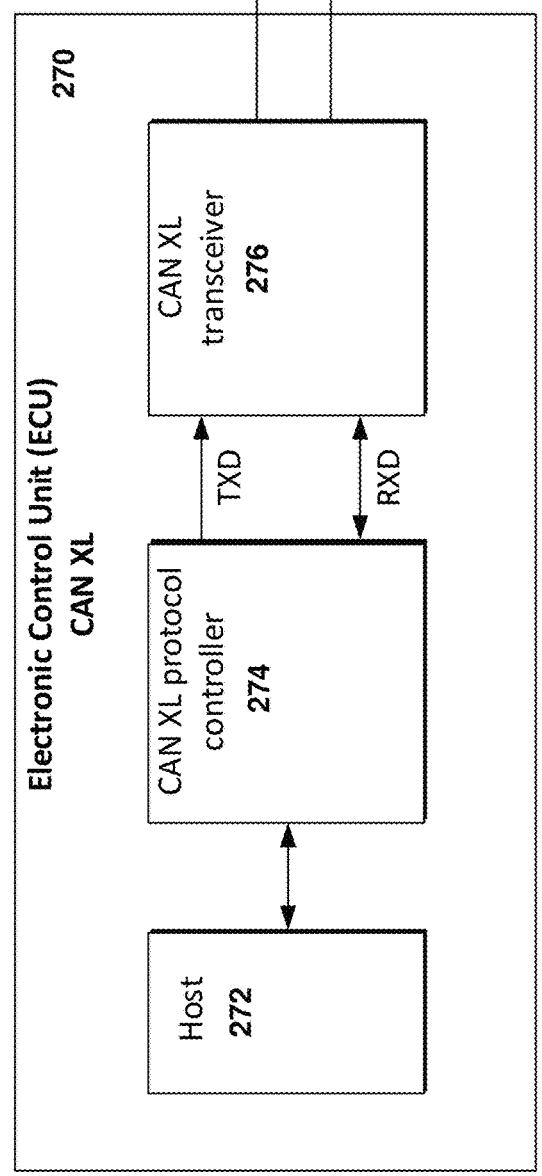
FIG. 2A
FIG. 2B

1100

1102 — DETERMINING, BY A DEVICE COMPRISING A PROCESSOR, A TRANSCEIVER MODE BASED ON A FIRST CONTROLLER AREA NETWORK (CAN) XL TRANSCEIVER MODE SWITCH MESSAGE RECEIVED OVER A FIRST RECEIVE DATA SIGNAL ON A CAN XL NETWORK TO A FIRST TRANSCEIVER

1104 — IN RESPONSE TO DETERMINING THE TRANSCEIVER MODE, ROUTING, BY THE DEVICE, A SECOND CAN XL TRANSCEIVER MODE SWITCH MESSAGE OVER A SECOND RECEIVE DATA SIGNAL TO A SECOND TRANSCEIVER

FIG. 11

MONITORING CONTROLLER AREA NETWORK (CAN) XL NODES

TECHNICAL FIELD

The disclosed subject matter relates to systems and methods for monitoring of Controller Area Network (CAN) XL nodes.

BACKGROUND

The automotive industry extensively utilizes CAN bus technology. Many other industries utilize CAN as well. To date, two generations of CAN protocols have been primarily implemented in mass-produced vehicles: CAN (now referred to as CAN Classic) and CAN Flexible Data Rate (CAN FD). A third generation, called CAN XL (or CAN EL), is forthcoming and is expected to be included in a future version of the International Standards Organization's (ISO) ISO-11898-1 and/or ISO-11898-2 standard. CAN XL is expected to require a new type of hardware CAN transceiver, which will be switched between two operational modes during communication.

CAN XL transceivers switch between an asymmetric differential mode (in which there are two bus states: dominant/recessive) and a symmetric differential mode (e.g., push/pull or logic 0/1). This is a significant change as compared to CAN Classic and CAN FD transceivers, because CAN Classic and CAN FD transceivers are not switched and always operate in an asymmetric differential mode. Thus, CAN Classic and CAN FD transceivers do not support CAN XL networks with differential symmetric transmission. In this regard, CAN Classic and CAN FD transceivers do not support the push/pull or logic 0/1 mode of CAN XL transceivers.

It is noted that an asymmetric differential mode indicates that a transceiver transmits/receives in a recessive bus state using zero voltage, and in the dominant bus state uses positive differential CAN bus voltages. A symmetric differential mode indicates that a transceiver transmits/receives positive and negative differential CAN bus voltages, but not zero voltage.

In total, a CAN Classic/CAN FD transceiver operates with two differential bus voltages, while a CAN XL transceiver can operate with four differential bus voltages. A CAN Classic/CAN FD transceiver cannot differentiate between positive and negative differential bus voltages representing logic 0/1 bits of a CAN XL data phase when transmitted by a CAN XL transceiver in symmetric differential mode. In this regard, a CAN Classic/CAN FD transceiver will recognize these bits as the same value. In a CAN XL data phase, the data bits are transmitted and received in symmetrical differential mode. Consequently, the CAN Classic/CAN FD transceiver cannot receive the actual data bits contained in a CAN XL data phase.

The mode switching of a CAN XL transceiver can require a CAN XL protocol controller to switch the transceiver. A CAN XL protocol controller can detect, among other things, the start and end of arbitration phases and the data phase of a CAN XL data frame by using a received data signal RXD from a transceiver. Absent such a CAN XL protocol controller, the CAN XL transceiver cannot determine when/how to switch modes because mode switching logic is not specified for the transceiver. This transceiver mode control is new for CAN XL and is far more complex than the operation of CAN Classic/CAN FD transceivers.

CAN XL communication problems can comprise the following, among others:

(1) At least one CAN XL node is unexpectedly transmitting a CAN frame and the CAN XL node that is transmitting the frame needs to be determined. The CAN frame identifier is not included in a CAN database specification and therefore that database cannot conclude which CAN XL node is unexpectedly transmitting the CAN frame.

(2) At least one CAN XL node is unexpectedly transmitting a CAN frame, and an associated CAN frame identifier is not included in a CAN database specification—it is assigned to another CAN XL node. The CAN XL node that is transmitting the frame needs to be determined.

(3) At least one CAN XL node is unexpectedly causing CAN error flag, which is then correctly echoed by other CAN XL nodes. The error flag is an indication of communication error and causes a failed frame transmission in which the frame does not reach intended CAN XL nodes. The error flag is not included in a CAN database specification, and therefore a CAN database cannot conclude which CAN XL node is responsible. The CAN XL node that is transmitting the initial, as well as superimposed, error flag needs to be determined.

(4) A CAN XL node is unexpectedly not transmitting frames, however, it may transmit ACK (an acknowledgement bit) as confirmation of other CAN nodes transmitting frames. However, all CAN XL nodes are expected to transmit ACK at the same bit time, and therefore it cannot be determined if a particular CAN XL node is transmitting an ACK. The CAN XL node that is transmitting the ACK needs to be determined.

(5) At least one CAN XL node is attempting to transmit a frame, but there is a fault in the frame transmission and the CAN identifier cannot be identified. The CAN XL node that is transmitting the frame needs to be determined.

(6) At least one CAN XL node is transmitting a frame in a format (e.g., normal frame, extended frame, remote frame, or flexible data frame) that is not the expected frame format. The CAN XL node that is transmitting the frame needs to be determined.

(7) A CAN XL node is disturbing the bus, which causes frame transmission failure. The CAN XL node that is disturbing the bus needs to be determined.

(8) In a system analysis situation, with or without a CAN database specification available, frame transmission information needs to be acquired from a CAN XL system and which CAN identifiers are used needs to be determined with CAN XL nodes for data frame transmission.

Consequently, tapping and/or monitoring of associated RXD signals for further analysis can be beneficial.

By definition, the CAN XL protocol supports the CAN Classic data frame formats Classical Base Frame (CBFF) and Classical Extended Frame Format (CEFF), the CAN FD data frame formats FD Base Frame Format (FBFF) and FD Extended Frame Format (FEFF), and the CAN XL frame format (XLFF). Therefore, CAN XL nodes can use data frames with an asymmetric differential mode only, as well as data frames with an asymmetric differential mode and symmetric differential mode.

However, existing CAN monitoring devices connected in-between CAN XL nodes cannot detect CAN XL data phases and do not switch transceiver modes. Thus, existing CAN monitoring devices are unable to monitor CAN XL nodes and therefore cannot perform diagnostic functions on a CAN XL network. A monitoring device must accomplish transceiver mode switching of a plurality of CAN XL transceivers between different modes at the same time. Existing CAN XL nodes (e.g., CAN XL transceiver+CAN XL protocol controller) do not facilitate the foregoing either. Therefore, there exists a need for a monitoring device/method that can monitor CAN XL nodes in order to identify and address CAN XL node faults.

BRIEF DESCRIPTION OF DRAWINGS

FIGS. 2A and 2B are block diagrams of exemplary system CAN Electronic Control Units (ECUs) in accordance with one or more embodiments described herein.

FIG. 11 is a block flow diagram for a process for CAN XL node monitoring in accordance with one or more embodiments herein.

SUMMARY

Figure 1:
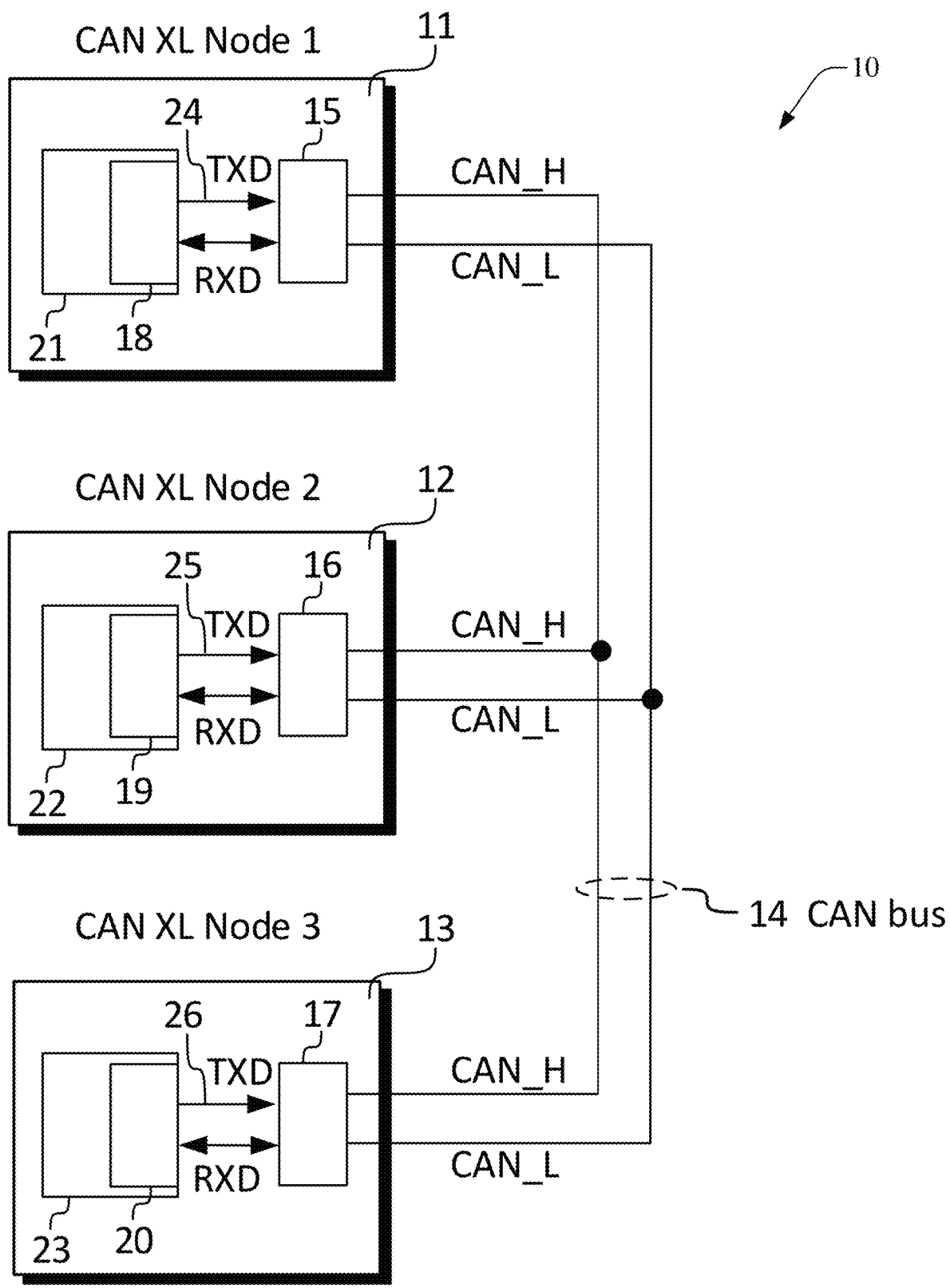
FIG. 1 is a block diagram of a CAN network comprising CAN XL nodes in accordance with one or more embodiments described herein.

Embodiments herein can support CAN XL nodes, in addition CAN Classic and CAN FD nodes. Standard CAN XL components for ECUs can be utilized in embodiment herein (e.g., in monitoring devices). Transceivers herein can be switched between different modes, depending on which CAN bus a data frame is received from, and to which CAN bus(es) the frame is to be forwarded. Embodiments herein can utilize a router connected between CAN XL components, which can translate and route transceiver mode requests across CAN XL transceivers.

According to an embodiment, a method can comprise determining, by a device comprising a processor, a transceiver mode based on a first Controller Area Network (CAN) XL transceiver mode switch message received over a first receive data signal on a CAN XL network to a first transceiver, and in response to determining the transceiver mode, routing, by the device, a second CAN XL transceiver mode switch message over a second receive data signal to a second transceiver.

In an embodiment, the method can further comprise in response to determining the transceiver mode, routing, by the device, a third CAN XL transceiver mode switch message over a third receive data signal to a third transceiver.

It is noted that the first CAN XL transceiver mode switch message comprises a command to switch from an asymmetric arbitration mode to a symmetric data receive mode. It is further noted that the second CAN XL transceiver mode switch message comprises a command to switch from an asymmetric arbitration mode to a symmetric data transmit mode.

In an embodiment, the first CAN XL transceiver mode switch message comprises a command to switch from a symmetric data receive mode or a symmetric data transmit mode to an asymmetric arbitration mode and the second CAN XL transceiver mode switch message comprises the switch from the symmetric data receive mode or the symmetric data transmit mode to the asymmetric arbitration mode.

It is noted that the second CAN XL transceiver mode switch message is sent within a defined period of time following reception of the first transceiver mode switch message.

In one or more embodiments, the first receive data signal and the second receive data signal comprise bidirectional receive data signals. It is noted that the first transceiver and the second transceiver each comprise CAN XL transceivers.

In various embodiments, message routing is facilitated by a router of the device and a protocol controller of the device.

In another embodiment, a monitoring device can comprising a memory, a processor operatively coupled to the memory and comprising computer executable components comprising a protocol controller that determines a transceiver mode based on a first Controller Area Network (CAN) XL transceiver mode switch message received over a first receive data signal on a CAN XL network to a first transceiver, and a router that, in response to the protocol controller determining the transceiver mode, routes a second CAN XL transceiver mode switch message over a second receive data signal to a second transceiver.

In an embodiment, in response to the protocol controller determining the transceiver mode, the router can route a third CAN XL transceiver mode switch message over a third receive data signal to a third transceiver.

It is noted that the first CAN XL transceiver mode switch message comprises a command to switch from an asymmetric arbitration mode to a symmetric data receive mode. It is further noted that the second CAN XL transceiver mode switch message comprises a command to switch from an asymmetric arbitration mode to a symmetric data transmit mode.

In an embodiment, the first CAN XL transceiver mode switch message comprises a command to switch from a symmetric data receive mode or a symmetric data transmit mode to an asymmetric arbitration mode and the second CAN XL transceiver mode switch message comprises the command to switch from the symmetric data receive mode or the symmetric data transmit mode to the asymmetric arbitration mode.

It is noted that the first receive data signal and the second receive data signal comprise bidirectional receive data signals.

According to an embodiment, the protocol controller comprises a single protocol controller, and wherein the protocol controller is communicatively coupled to the router.

In another embodiment, the protocol controller comprises a group of protocol controllers each communicably coupled to a CAN XL transceiver of a group of CAN XL transceivers of the monitoring device.

In yet another embodiment, A non-transitory machine-readable medium, comprising executable instructions that, when executed by a processor, facilitate performance of operations, comprising determining a first transceiver mode based on a first CAN XL transceiver mode switch message received over a first receive data signal to a first transceiver, and in response to determining the transceiver mode, routing a second CAN XL transceiver mode switch message over a second receive data signal to a second transceiver.

In an embodiment, the first receive data signal and the second receive data signal comprise bidirectional receive data signals. In another embodiment, the first transceiver and the second transceiver each comprise CAN XL transceivers.

DETAILED DESCRIPTION

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Embodiments herein enable tapping and/or monitoring of the RXD signals (e.g., 212, 222, 232 as later discussed in greater detail) for further analysis.

Turning now to FIG. 1, there is illustrated an example, non-limiting CAN XL network 10 comprising CAN XL nodes 11, 12, and 13 (collectively the CAN XL nodes). The CAN XL nodes can be connected to a CAN bus 14 (e.g., a two-wire CAN bus). Each CAN XL node 11, 12, or 13 can comprise a CAN XL transceiver (e.g., CAN XL transceiver 15, 16, and 16 respectively), a CAN XL protocol controller (e.g., CAN XL protocol controller 18, 19, and 20 respectively) which can facilitate protocol bit stream reception and transmission on data link layer according to ISO 11898-1, and host (e.g., application software running on microcontroller 21, 22, and 23 respectively). It is noted that, according to an embodiment, a CAN XL protocol controller need not comprise a full CAN XL protocol controller with all standard functions. In this regard, a CAN XL protocol controller 18, 19, or 20 (or 250, 250a, 250b, or 250c as later discussed in greater detail) can be simplified to include only detection of arbitration phase, data phase and transceiver mode switch message generation.

According to an embodiment, CAN XL transceivers herein can comprise differential bus connections and can comprise at least three bus modes: (1) asymmetric mode, (2) differential receive mode, and (3) differential transmit mode. It is noted that, according to an embodiment, only one mode can be operable for a given CAN XL transceiver at a given moment in time.

A microcontroller 21, 22, or 23 can be connected to the respective CAN XL protocol controller 18, 19, 20. According to an embodiment, The CAN XL controllers can optionally be a part of the microcontrollers (e.g., 21, 22, or 23). Each CAN XL node 11, 12, and/or 13 can comprise therein a bus interface circuit (e.g., a CAN XL transceiver 15, 16, or 17, respectively).

CAN XL nodes 11, 12, and/or 13 can be connected to a linear passive CAN bus 14. A CAN bus can comprise a multi-master serial communication bus which can comprise two physical wires: CAN_H and CAN_L, which can be connected to a respective terminal of each CAN node. All CAN nodes (e.g., ECUs) in a CAN XL network 10 can be connected to these two wires.

The CAN XL protocol can utilize a serial bit stream with logical values 0 and 1, also known as dominant and recessive bits during arbitration phase, and logic 0/1 in the data phase, that make up CAN XL frames and/or other protocol symbols transmitted over the CAN bus 14. In this regard, respective protocol controller and transceiver RXD/TXD signals handle data bit streams with logical values 0 and 1. However, on the CAN bus 14, the bits are represented by analog voltages or states associated with logic values are called dominant/recessive for the arbitration phase, and logic 0/1 for data phase.

All CAN XL nodes 11, 12, and 13 are capable of transmitting data frames to each other. The CAN XL protocol controllers 18, 19, and 20 can facilitate reception and/or transmission of CAN frames and error events. The transmitted bit values 0 and 1 from the CAN XL protocol controller 18, 19, or 20 can be converted in the CAN XL transceivers 15, 16, and/or 17 in each CAN XL node into four voltage levels (e.g., recessive and dominant states in the arbitration phase and a logic 0/1) on the CAN bus 14. In this regard, the recessive state is caused by recessive data being transmitted over the bus, while the dominant state is caused by dominant data being transmitted over the bus. These states relate to two voltage ranges on the CAN bus 14. The logic bus 0 state is caused by logic 0 data being transmitted on the bus, and logic 1 state is caused by logic 1 data being transmitted on the bus. These states relate to two further voltage ranges on the CAN bus 14. For reception, the opposite can occur: the CAN XL transceivers 15, 16, and/or 17 can convert the four voltage levels on the CAN bus 14 into suitable levels logic 0/1 to the CAN XL protocol controllers 18, 19, and/or 20.

All CAN XL nodes can comprise a wired-AND connection on CAN_H and CAN_L bus wires during an arbitration phase. In this regard, all CAN nodes can be directly connected to each other by connecting all the CAN_H wires, and all the CAN_L wires, respectively. Each CAN XL node 11, 12, and/or 13 can drive the CAN bus 14 into a series of recessive/dominant states or logic 0/1 states, thus enabling a multi-master communication network. The CAN protocol data link layer can define how this multi-master sharing of the network is performed (e.g., according to a collision detection multiple access (CDMA) operation).

A CAN database can be used, among other purposes, for associating CAN frame identifiers to each CAN XL node. The CAN database can be used as a base for implementation of the frame transmission and reception in each CAN XL node, as well as for analysis of the communication or runtime operations of the CAN XL nodes by connecting an optional CAN analysis tool. The CAN database can comprise a lookup table. In this regard, an identifier can be input, and the CAN XL node name is obtained as a result. A CAN XL identifier can comprise a unique characteristic in that it points to a specific CAN XL node as being the transmitter or receiver of a certain frame. Other CAN XL protocol items (e.g., Start-of-frame (SOF), acknowledge (ACK), error flag (EF), overload flag (OF)) do not uniquely associate with a specific CAN XL node since they are intentionally identical for all CAN XL nodes in that such events have no included identifier. The foregoing makes a CAN XL database useful only when an error event occurs that includes an identifier, and the identifier exist in the database. Further, the CAN XL database normally implies that any given identifier is only associated to one CAN XL node as the transmitter.

The CAN bus 14 interconnection of CAN XL nodes 11, 12, and/or 13 correspond to a "wired-AND" mechanism during an arbitration phase. Recessive bits (e.g., logic 1) can be overwritten by dominant bits (e.g., logic 0). In a recessive state, a dominant bit from any one or more CAN XL nodes can result in a dominant bus state. So long as no CAN XL nodes are sending a dominant bit, the CAN bus 14 will be in a recessive state.

Only the CAN XL node providing the highest differential bus voltage is the CAN XL node that dominates the CAN bus voltage (Vdiff). This is the intended function of a CAN bus according to ISO 11898-2. During certain protocol events, more than one CAN bus 14 can drive the CAN bus into dominant state, for instance, for SOF, dominant bits of identifier during arbitration field, ACK, error flag, overload flag. When more than one CAN XL node is transmitting a dominant state at the same time, it cannot always be determined for each CAN XL node respectively, whether it is transmitting dominant data or recessive data. This can cause a dominant state and a recessive state on the bus, respectively, by analyzing bus voltage Vdiff, since all CAN nodes are directly connected to each other via the CAN bus. Determining this can be even more difficult if the dominant state output voltage from each CAN XL node is close to one other such that they cannot be reliably distinguished. This is not a problem in CAN communication for the ECUs but adds difficulty to advanced CAN network analysis.

However, if analysis regarding whether the first CAN node XL or the second CAN XL node 12 (or both) are actually driving the CAN bus 14 into a dominant state, determining voltage on the CAN bus 14 can be difficult. It can be even more difficult to achieve a method that works for all CAN buses, in all vehicles, including all variables such as transceiver brand, age, temperature etc., since dominant state output voltage is permitted to vary by a factor 1:2 (+1.5V to +3.0V), and there can exist a distribution of voltages in which few ECUs have less Vdiff drive capability than other ECUs on the same CAN bus 14.

Further, analyzing the electrical current that each CAN XL node drives into the CAN bus 14, while at the same bit time transmitting dominant data, can be difficult since in principle, it is only the CAN node with the highest Vdiff drive capability that forces current. Alternatively, it is generally only the CAN nodes with highest Vdiff that actually forces a reliably measurable current to flow out of the transceiver CAN_H, through the termination components, impedance of the CAN wires, and back into the CAN_L wire of the CAN XL transceiver.

If it is required be analyzed, for instance, whether a first CAN XL node (e.g., CAN XL node 11) or a second CAN XL node (e.g., CAN XL node 12) (or both) is actually driving the CAN bus 14 into a dominant state, this cannot be determined in a reliable way by measuring the electrical current flow to/from the CAN XL transceiver 15 or 16 and the CAN bus.

FIG. 2 illustrates internal structures of CAN ECUs for CAN Classic+CAN FD (ECU 260 FIG. 2A) and CAN XL (ECU 270 FIG. 2B). ECU 260 can comprise a host (e.g., microcontroller) 265, CAN protocol controller 264, and CAN transceiver 266.

In a CAN Classic+CAN FD ECU 260, the RXD (receive data) pin for digital receive data is unidirectional. In CAN XL, the RXD pin is instead bidirectional, and thus requires a CAN XL protocol controller 274 to control the mode switching of CAN XL transceiver 276. To operate a CAN XL node, a CAN XL protocol controller 274 and a CAN XL transceiver 276 thus required. It is noted that, according to an embodiment, each receive data (e.g., RXD) signal or electronic wire connection on a CAN XL transceiver can: (a) to convey a data bit stream from a transceiver at reception to a protocol controller; and (b) to convey a transceiver mode switch message to the transceiver (e.g., this is a short duration message in which the direction of the signal is temporarily changed).

Figure 3:
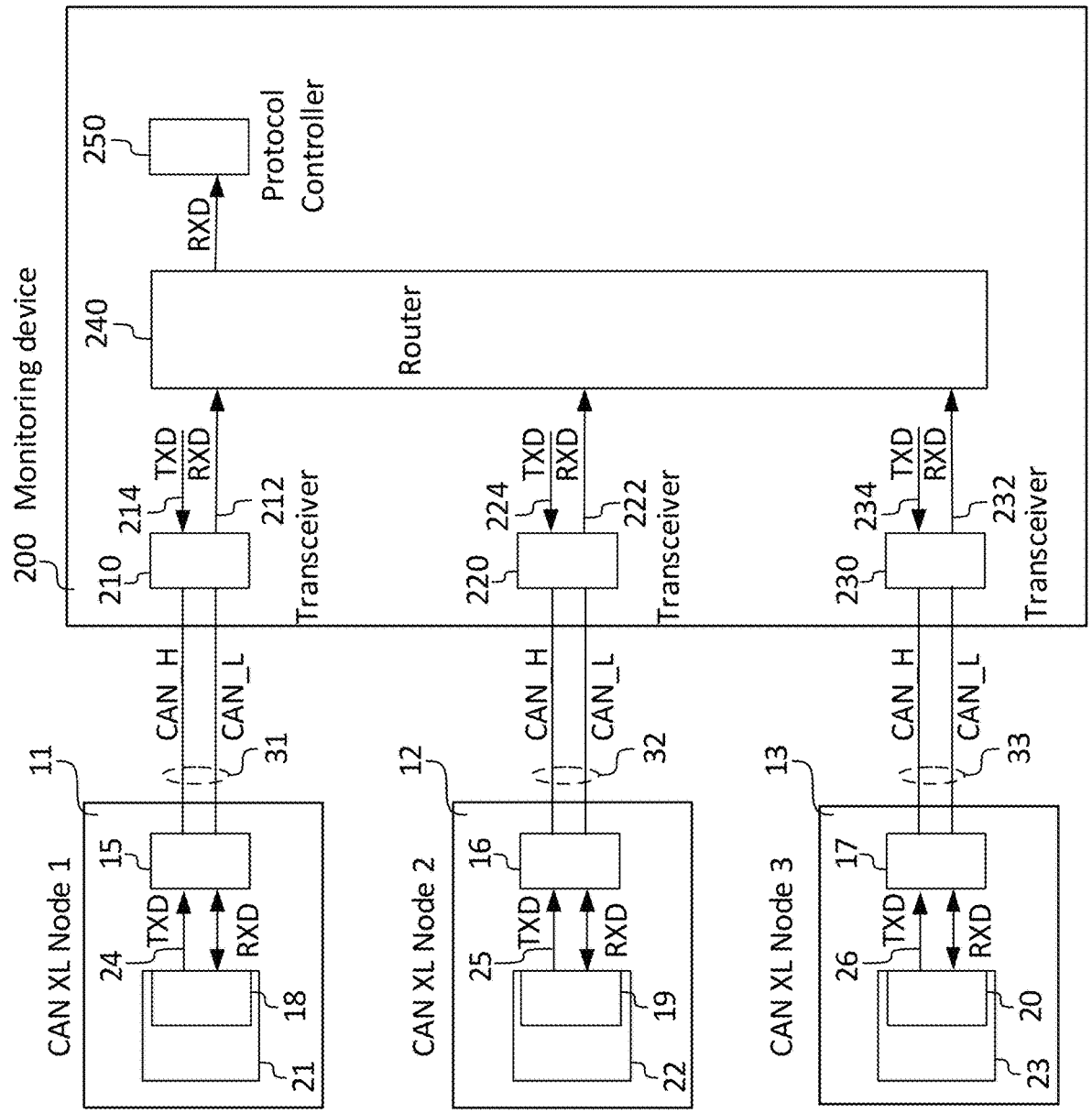
FIG. 3 is a block diagram of a CAN network comprising CAN XL nodes in accordance with one or more embodiments described herein.

FIG. 3 illustrates a monitoring device 200 communicatively coupled to CAN XL nodes 11, 12, and 13 for monitoring of the CAN XL nodes. It is noted that FIG. 3 illustrates a non-switched transceiver mode which can comprise a normal RXD data direction, though it is further noted that monitoring device 200 supports bidirectional RXD.

The monitoring device 200 can be in-between the monitored CAN XL nodes 11, 12, and/or 13. The monitoring device 200 can comprise standard CAN XL transceivers 210, 220, and/or 230, and protocol controller 250 which comply with CAN XL physical layer standards. According to an example, at CAN XL frame reception from CAN XL node 11, all transceivers (e.g., CAN XL transceivers 210, 220, and/or 230) switch modes simultaneously during a CAN XL data phase. During a CAN XL data phase, CAN XL transceivers 210, 220, and/or 230 can be switched to different modes. The transceiver on the CAN bus 31, 32, and/or 33 from which the CAN XL frame is received (e.g., one transceiver at a time) is the only transceiver to be switched to symmetric reception, since it is receiving the frame on CAN bus 31. The remaining CAN XL transceivers (220 and 230 in this example) to which the frame is to be transmitted, switch to symmetric transmission since the remaining transceivers transmit the same frame to CAN buses 32 and 33. A transceiver switch request can be generated in protocol controller 250 according to the CAN XL data link layer standard and can be sent in opposite direction on an RXD signal as shown in FIG. 3.

In some embodiments, the router 240 only routes transceiver mode messages among CAN XL transceivers herein (e.g., not routing payload data bit streams). In such embodiments, payload data bit streams can be routed by an additional/supplemental routing device (not depicted) and TXD connections need not be made between CAN XL transceivers herein and the router 240.

In other embodiments, the router 240 can route payload data bit streams and signals over TXD connections. In this regard, TXD signals 214, 224, and/or 234 can be connected between respective CAN XL transceivers and the router 240.

It is noted that the monitoring device 200, router 240, protocol controller 250, and/or other components described herein can comprise a processor and/or a memory. According to an embodiment, the router 240 and/or protocol controller 250 can comprise computer-executable components. In other embodiments, the router 240 and/or protocol controller 250 can comprise physical components of the monitoring device 200.

First, the router 240 can receive a mode switch message 461 and route the mode switch message 461 to CAN XL transceiver 210 in order to switch CAN XL transceiver 210 to symmetric reception. Next, router 240 can receive the mode switch message 461, replace the mode switch message 461 with mode switch message 458, and route mode switch message 458 to CAN XL transceivers 220 and 230 in order to switch CAN XL transceivers 220 and 230 to symmetric transmission. It is noted that forwarding of dominant data and monitoring of actions can occur concurrently with mode switch message routing. It is further noted that data phase logic 0/1 data bits can be forwarded by the monitoring device 200.

According to an embodiment, during a data phase, data can be logic 0/1. During an arbitration phase, data can be dominant or recessive.

Figure 4A:
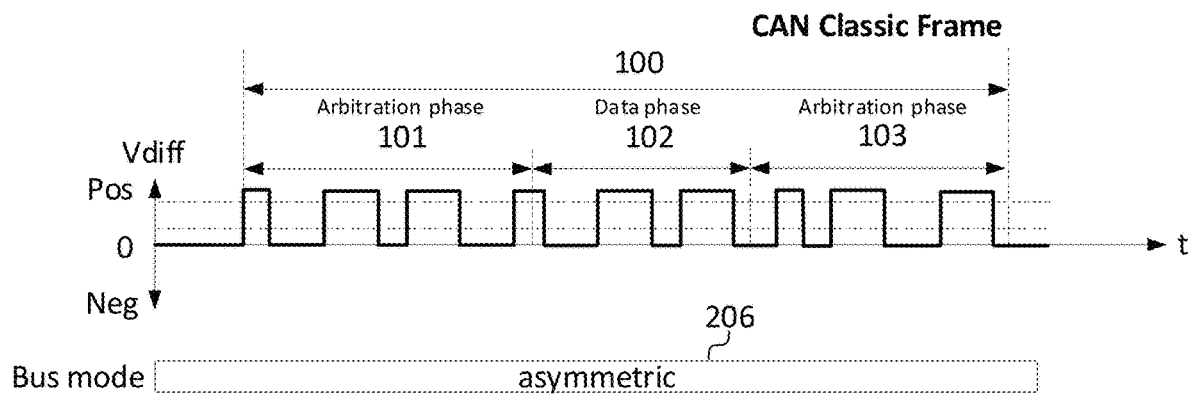
FIGS. 4A-4C are block diagrams of exemplary system CAN formats in accordance with one or more embodiments described herein.
Figure 4B:
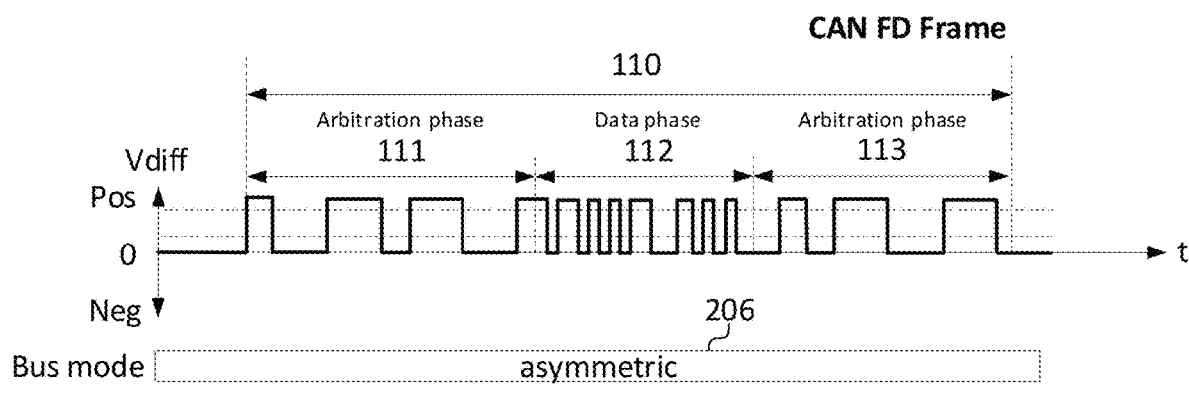
Figure 4C:
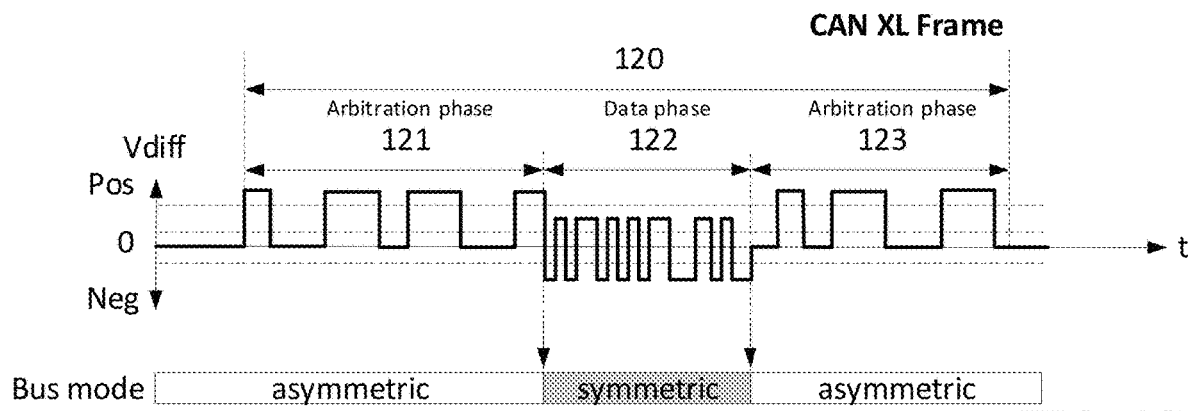

FIG. 4 illustrates differential bus voltages for data frames in various formats. For instance, FIG. 4A depicts CAN Classic 100, FIG. 4B depicts CAN FD 110, and FIG. 4C depicts CAN XL 120.

According to an embodiment, a CAN XL frame can be transmitted (e.g., by CAN XL node 11 on CAN bus 31) and received by CAN XL transceiver 210 of the monitoring device 200). During arbitration phase 121 and 123, dominant data can be forwarded from CAN XL transceivers 210 to 220 and 230, and further forwarded to CAN XL nodes 12 and 13.

There exists a potential problem in that the monitoring device 200 could detect start of data phase on a bus for which the monitoring device 200 itself is forwarding a data phase to during 124. For example, the CAN XL transceiver 220 could detect a data phase while forwarding a frame from CAN bus 31 to CAN bus 32. This is undesired, because it could lead to all CAN XL transceivers 210, 220, and/or 230 eventually switching to symmetric transmit mode on CAN buses 31, 32, and/or 33. This would violate the principle of exclusive bus transmit access during a data phase and a system comprising CAN XL nodes 11, 12, and 13 would fail to properly transmit information. The following are two exemplary solutions to the aforementioned potential problem:

(1) once CAN XL transceivers 220 and 230 are switched to the symmetric transmit mode by a message from router 240 and while the data phase is being currently transmitted on buses 32, 33, the router 240 will ignore RXD signal data from CAN XL transceivers 220 and 230.

(2) the router 240 only permits one mode request pass through it at any given time and blocks additional requests while a first request is still active.

In an arbitration phase, the relation of transmit data bit stream signal TXD (transmit) and bus voltage is known. For instance, TXD=1 produces a zero bus voltage (recessive) and TXD=0 produce a positive bus voltage (dominant).

According to an embodiment, when protocol controller 250 does not detect a CAN XL data phase, all CAN XL transceivers 210, 220, and/or 230 of the monitoring device 200 can operate in an asymmetric mode.

Figure 5:
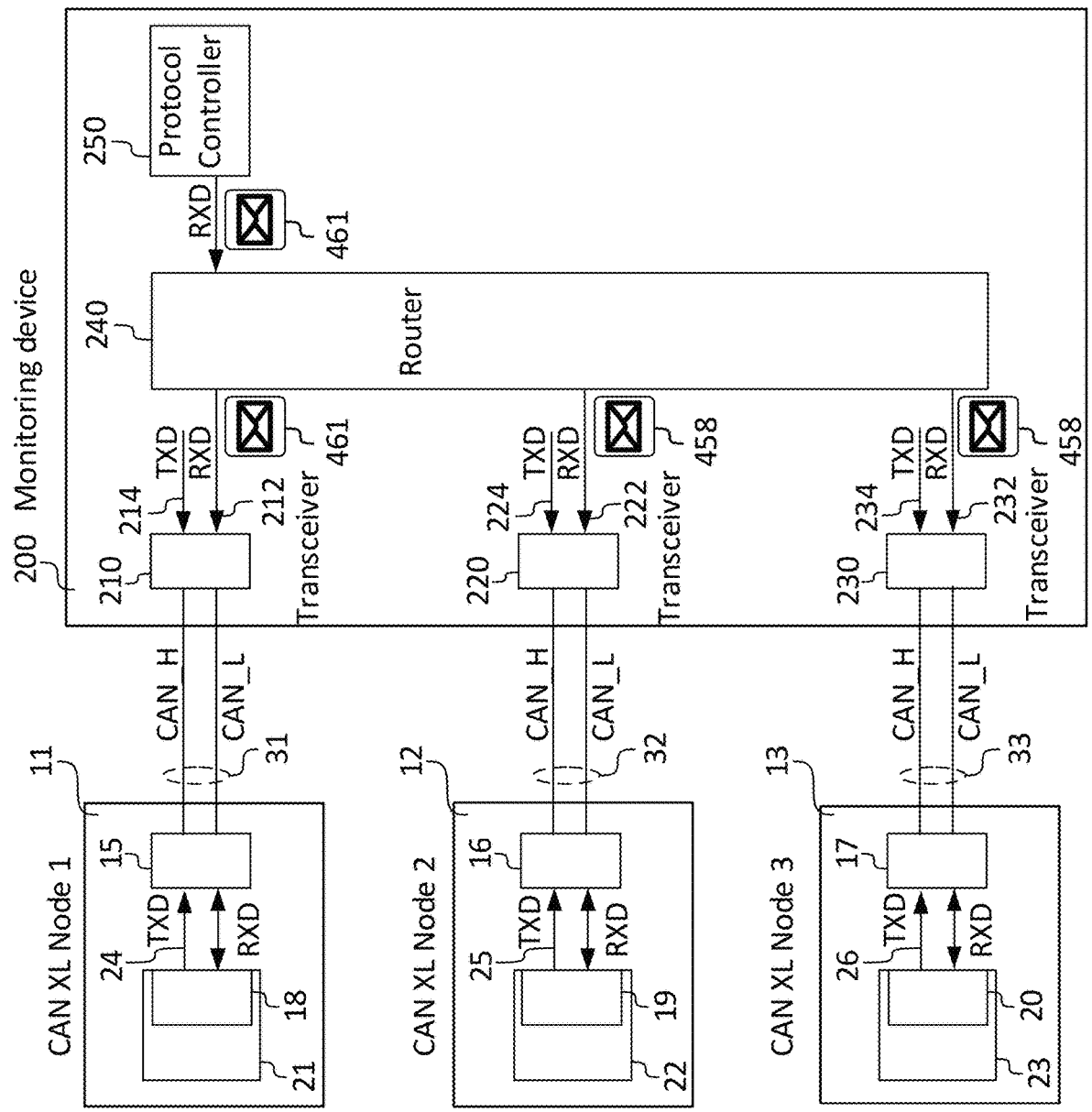
FIG. 5 is a block diagram of a CAN network comprising CAN XL nodes in accordance with one or more embodiments described herein.
Figure 6:
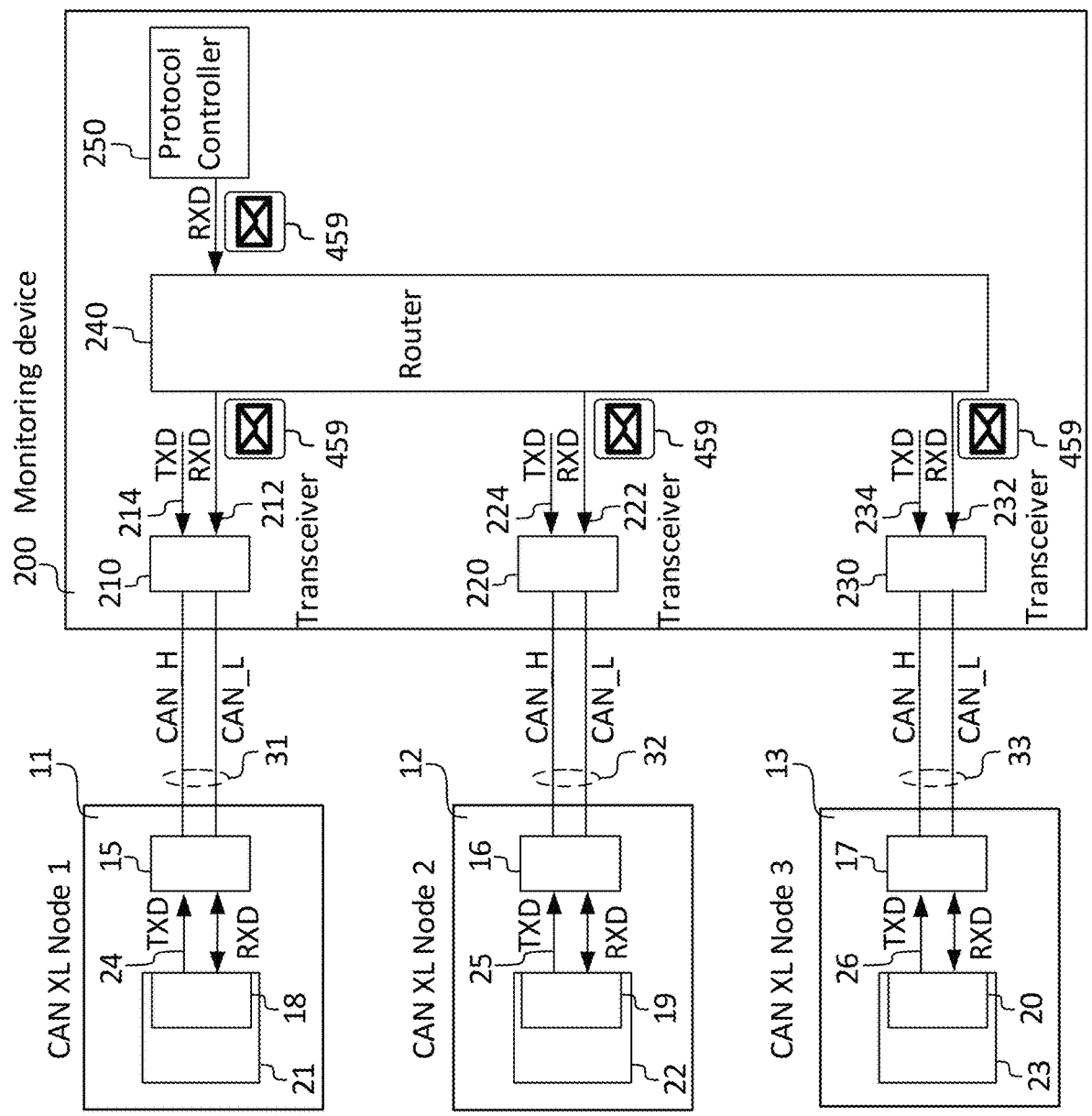
FIG. 6 is a block diagram of a CAN network comprising CAN XL nodes in accordance with one or more embodiments described herein.

According to an embodiment, routing of transceiver modes is performed among CAN XL transceivers 210, 220, and 230. In one or more embodiments, and as illustrated in FIG. 5, router 240 can be connected between CAN XL transceivers 210, 220, and/or 230 and protocol controller 250. It is noted that, according to an embodiment, standard CAN XL transceivers and CAN XL protocol controllers can be utilized herein. However, such CAN XL transceivers interconnected in order to operate the monitoring device 200 comprising a plurality of CAN XL transceivers. In FIGS. 5 and 6, routing of messages controlling transceiver modes in/out and/or within the monitoring device 200 are depicted herein. According to an example, a CAN XL data frame can be received by CAN XL transceiver 210 from CAN XL node 11 on CAN bus 31. On the RXD signal, the bit stream I/O is received and forwarded by router 240 to protocol controller 250. The protocol controller 250 and transceiver RXD/TXD signals can handle data bit streams with logical values 0 and 1. However, on a CAN bus (e.g., CAN bus 31, 32, and/or 33), states associated with logic values can comprise dominant or recessive for the arbitration phase, and logic 0/1 for the data phase.

As depicted in FIG. 4C, near the end of arbitration phase 121, the protocol controller 250 (e.g., of monitoring device 200 comprising the router 240) has identified a frame as a CAN XL frame by the frame format bits in the frame control field received from the RXD signal. In FIG. 5, when data phase 122 is about to start, the protocol controller 250 can temporarily reverse the data direction of RXD signal and issue a control message 461 from the protocol controller to the router 240.

The router 240 can first identify the control message 461 as associated with switching from arbitration-to-data-reception. The router 240 can determine from which RXD signal 212, 222, or 232 that the frame originates from (RXD signal 212 in this example). The router 240 can accomplish the foregoing by tapping (e.g., by means of electrical signals, via optical paths, radio frequency paths or other electromagnetic paths, or other suitable electrical communication) into RXD signals 212, 222, and/or 232 for signal analysis. In this regard, any data sent via the CAN bus of each CAN XL node can be monitored by the monitoring device 200 in a non-intrusive manner. Thus, datalink timing between the CAN XL nodes remains unaffected and the CAN XL nodes share all events (transmitted recessive and dominant bits) exactly as if the CAN XL nodes were still directly connected to each other via a single CAN bus. This is applicable for all possible events, including events that are outside the defined events in the CAN XL protocol. Hence, with the routing of data over CAN buses to CAN XL nodes the monitoring device 200 does not affect the CAN network in a manner such that the behavior of the CAN XL nodes changes—the CAN XL nodes will act as if they are connected to a single CAN bus.

According to an embodiment, the router 240 can determine which CAN XL node won arbitration, and continue with remaining fields of the data frame by monitoring dominant bits being received after the identifier field. In this example, the router 240 can next forward the message 461 (e.g., unaltered) to CAN XL transceiver 210. The router 240 can next identify the control message 461 to as associated with switching from arbitration-to-data-reception. In this regard, the router 240 can determine from which RXD signal (RXD signal 212 in this example) the frame originates from. The router 240 can then replacing the message 461 with message 458. According to an embodiment, message 458 can be associated with switching from arbitration-to-data-transmission. The router 240 can then forwarding message 458 to the remaining transceivers (e.g., 220 and 230 in this example).

As depicted in FIG. 4C, near the end of data phase 122, the protocol controller 250 has identified the end of data phase by the received bits from RXD signal 212. In FIG. 6, at the same time when the arbitration phase 123 is about to start, the protocol controller 250 can again temporarily reverse the data direction of RXD signal 212 and issue a control message 459 from the protocol controller 250 to the router 240.

The router 240 can first identify the control message 459 as associated with switching to arbitration. The router 240 can determine from which RXD signal 212, 222, or 232 the frame originates from (e.g., RXD signal 212 in this example). In this example, the router 240 can then forward the message 459 (e.g., as unaltered) to the CAN XL transceiver 210. The router 240 can next identify the control message 459 to be associated with switching to arbitration. In this regard, the router 240 can determine from which RXD signal 212, 222, or 232 the frame originates from. The router 240 can then forward the message 459 to the remaining transceivers (e.g., CAN XL transceivers 220 and 230 in this example).

In another embodiment (not depicted herein), at transition from phase 121 to 122, there can be one message 461 for switching to symmetric data reception being forwarded to all CAN XL transceivers 210, 220, 230, and another message 458 only forwarded to remaining CAN XL transceivers 220, 230 for switching to symmetric data transmission.

Figure 7:
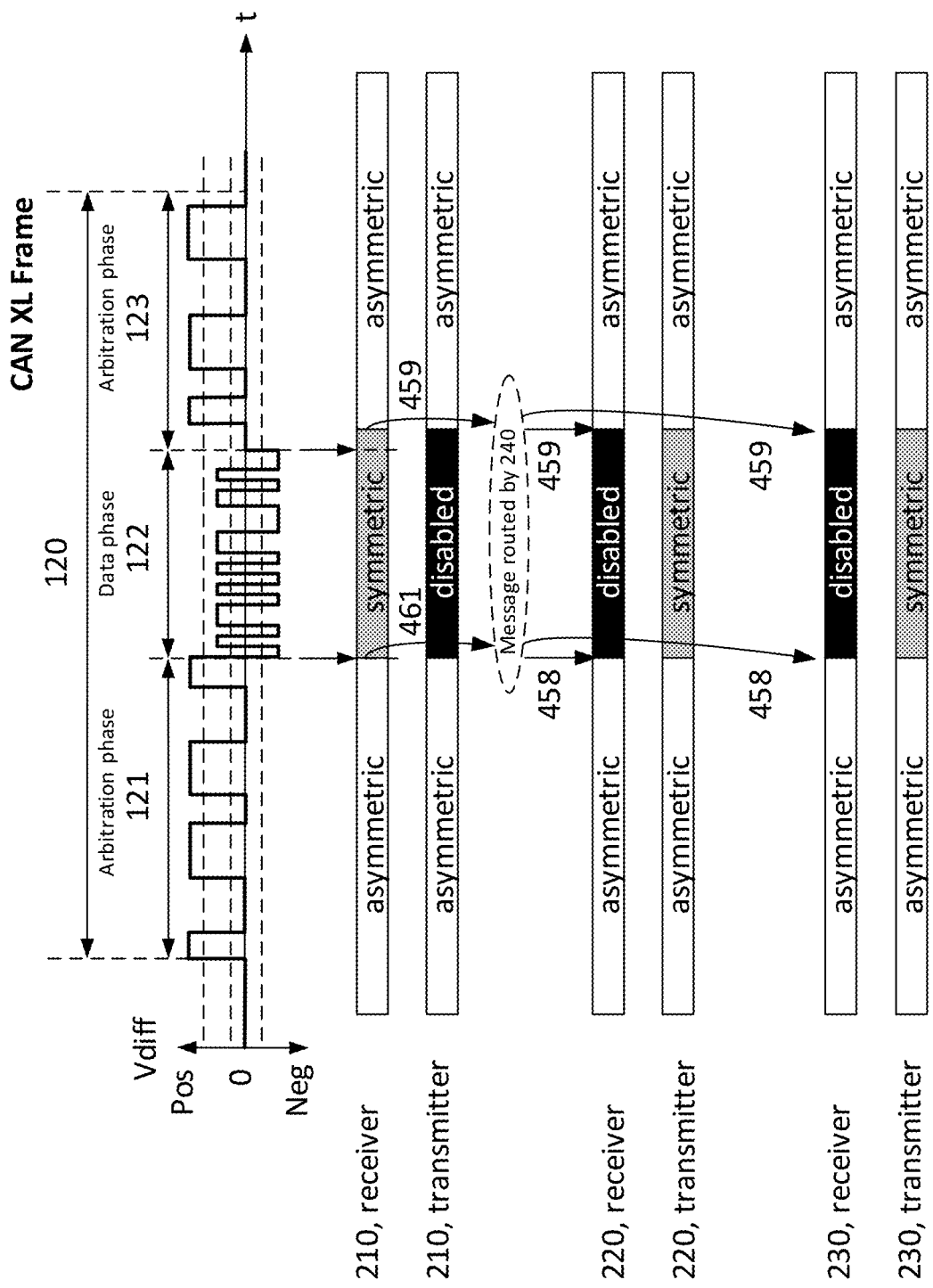
FIG. 7 is a block diagram of exemplary transceiver data phase detection, mode request, and mode routing in accordance with one or more embodiments described herein.

FIG. 7 illustrates exemplary transceiver data phase detection, mode request and mode routing (e.g., for CAN XL transceivers 210, 220, 230 switching by messages 461, 458, 459). According to an embodiment, router 240 can comprise a routing mechanism operating from all RXD signals (e.g., 212, 222, and 232). In an embodiment, during data phase 122, router 240 can latch and route only the single RXD signal of 212, 222, or 232 from which the arbitration phase 121 originated.

Figure 8:
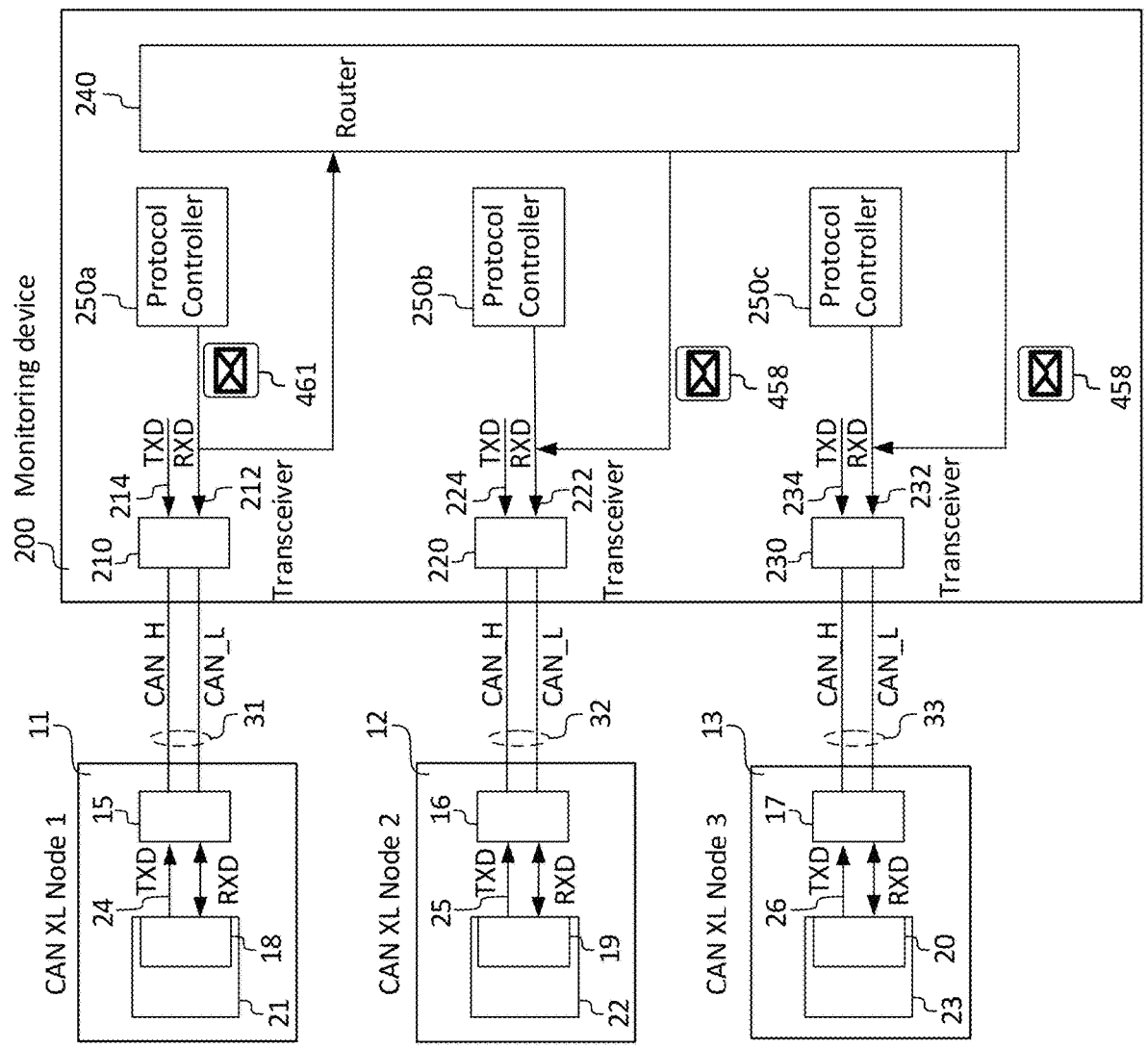
FIG. 8 is a block diagram of a CAN network comprising CAN XL nodes in accordance with one or more embodiments described herein.

FIG. 8 illustrates a diagram of monitoring device 200 and three CAN XL nodes 11, 12, and 13 to be monitored. Embodiments described herein with respect to FIG. 8 differ from those described with respect to FIGS. 5 and 6 with regard to, for instance, message routing and transceiver mode switching.

According to an embodiment, separate protocol controllers 250a, 250b, and 250c can be directly connected to each RXD signals 212, 222, and 232, respectively (e.g., signal wires for said RXD signals). Each pair of transceiver and protocol controller (e.g., CAN XL transceiver 210 and protocol controller 250a, CAN XL transceiver 220 and protocol controller 250b, and CAN XL transceiver 230 and protocol controller 250c), can be connected similarly with respect to CAN XL ECU 270 shown in FIG. 2B. In this embodiment the router 240 is connected to all RXD signals 212, 222, and 232, and does not directly interconnect said RXD signals.

According to another embodiment, when the router 240 receives a message 461 on any RXD signal 212, 222, or 232, the router 240 can replace that message with message 458 and forward message 458 to other transceivers. In this regard, the original message 461 does not route through router 240. The router 240 can comprise an anti-block function so that it does not route a message 458 back to the RXD signal from where the initiating message 461 came from within one frame. In this regard, the anti-block can be released after a message 459 has been received. This embodiment can enable large-scale reuse of standard CAN XL components, while simplifying the router 240. In this embodiment, router 240 need only detect message 461 and replace it with message 458. In this regard, message 459 can be ignored since its already handled by 210, 220, 230, 250a, 250b, and 250c. According to an embodiment, protocol controllers 250a, 250b, 250c can be configured not to transmit data frames, but just receive frames and issue control messages 461 and 459 (not message 458). Configuration of 250a, 250b, 250c can, for instance, be for transmit data signals TXD not connected to CAN XL transceivers 210, 220, and/or 230.

Figure 9:
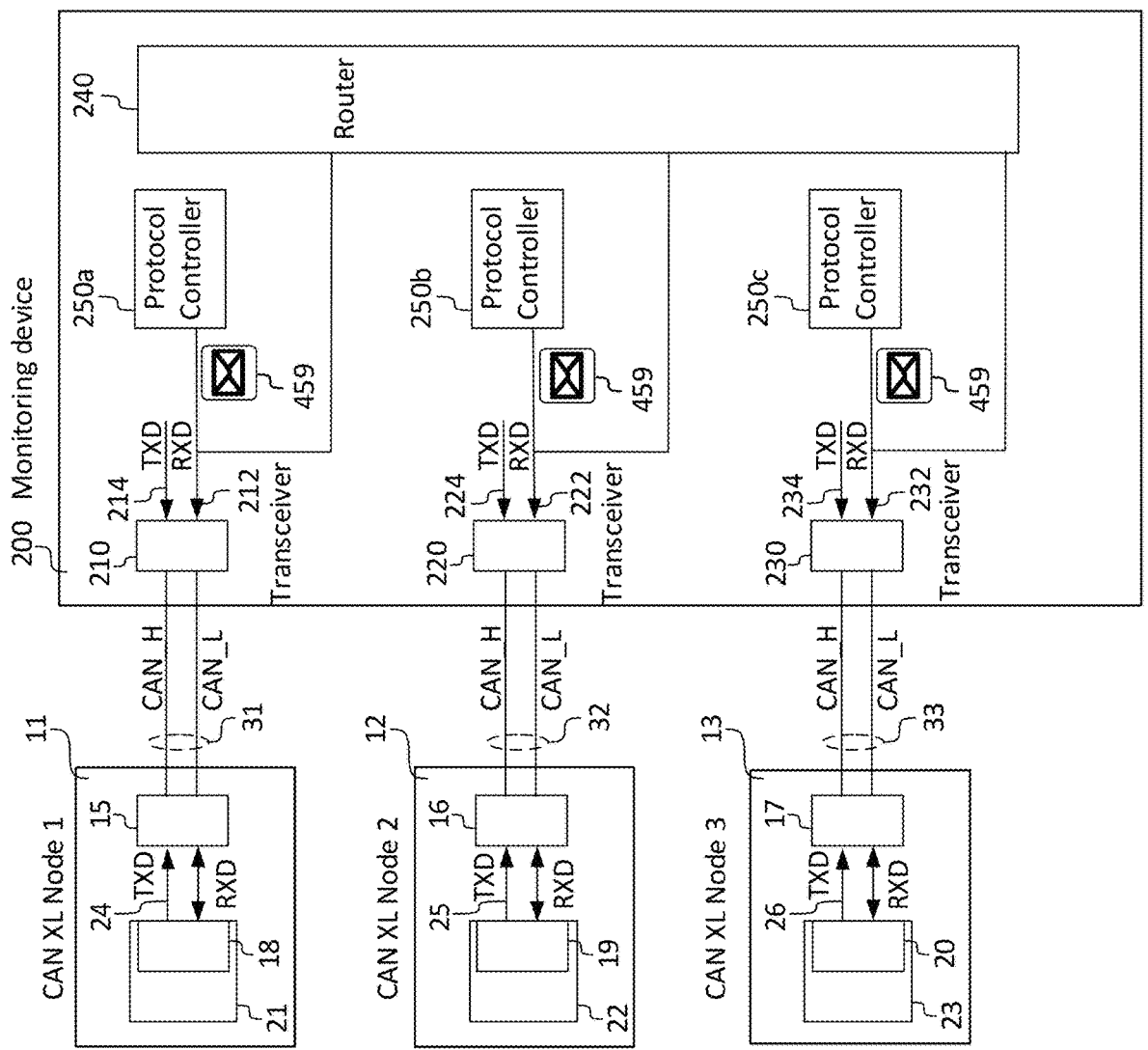
FIG. 9 is a block diagram of a CAN network comprising CAN XL nodes in accordance with one or more embodiments described herein.

In FIG. 9, and according to an embodiment, when data phase 122 is about to transition to arbitration phase 123, the router 240 need not route messages 459, as message routing is already performed by protocol controllers 250a, 250b, and/or 250c.

It is noted that, while none of the CAN XL transceiver 210, 220, and 230 detect a CAN XL data phase, all CAN XL transceivers 210, 220, and 230 of the monitoring device 200 can operate in an asymmetric mode.

According to an embodiment, the router 240 can comprise a fault tolerance in which a message 461 is not followed by a message 459 within a defined period time. In this regard, if the 461 message is not followed by the message 459 within this defined period of time, the router 240 can issue a message 459 to remaining transceivers for switching back to arbitration mode. According to an example, a defined period of time can be calculated based on, e.g., maximum duration of an error-free data phase, configuration of Data Length Code, maximum count of stuff bits and resulting total number of bits in data phase multiplied with nominal bit time, or can comprise a different or additional amount of time. At a data phase bit rate of 10 Mbit/s and data length=2048 bytes, timeout duration can be slightly less than 2 ms. This can occur, for instance, at corrupted frame transmissions.

Figure 10:
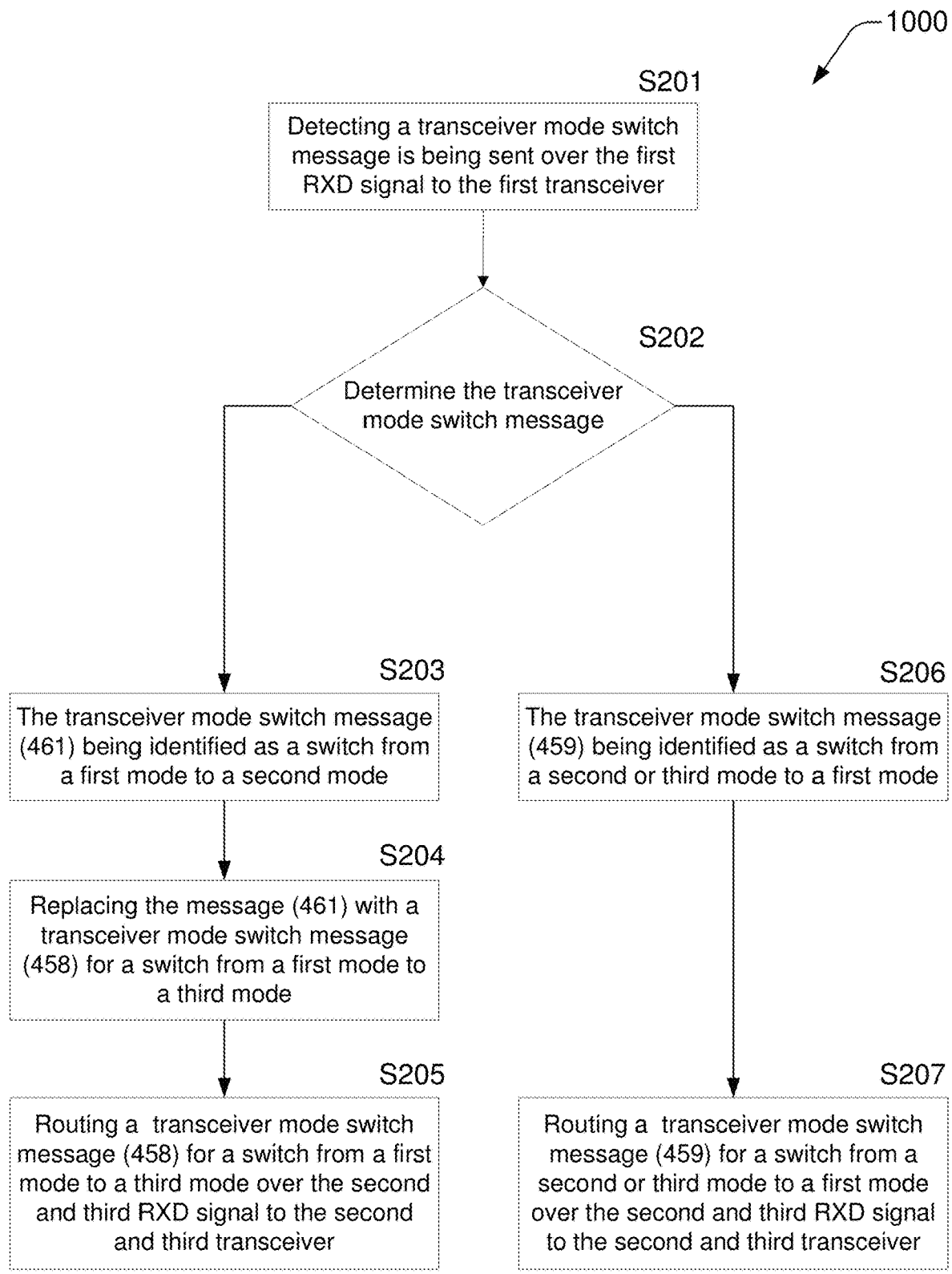
FIG. 10 is a flowchart of an exemplary method for CAN XL node monitoring in accordance with one or more embodiments herein.

FIG. 10 is a flowchart of an exemplary process 1000 for CAN XL node monitoring in accordance with one or more embodiments herein. At S201, a monitoring device 200 can detect whether a transceiver mode switch message is being sent over a first RXD signal to a first transceiver. At S202, the monitoring device 200 can identify or determine the transceiver mode switch message. At S203, the transceiver mode switch message (e.g., message 461) can be identified as a switch from a first mode to a second mode. At S204, the monitoring device 200 can replacing the message (e.g., message 461) with a transceiver mode switch message (e.g., message 458) for a switch from the first mode to a third mode. At S206, the monitoring device 200 can route the transceiver mode switch message (e.g., 458) for a switch from the first mode to the third mode over the second and third RXD signal to the second and third transceiver. At S206, the monitoring device can identify the transceiver mode switch message (e.g., 459) as a switch from a second or third mode to a first mode. At S207, the monitoring device 200 can route a transceiver mode switch message (e.g., message 459) for a switch from a second or third mode to a first mode over the second and third RXD signal to the second and third transceiver. It is noted that, with respect to process 1000, the first mode can comprise an asymmetric arbitration mode, the second mode can comprise a symmetric data receive mode, and the third mode can comprise a symmetric data transmit mode, though other combinations or orders are envisaged.

FIG. 11 illustrates a block flow diagram for a process 1100 for CAN XL mode routing in accordance with one or more embodiments described herein. At 1102, the process 1100 can comprise determining, by a device comprising a processor, a transceiver mode based on a first Controller Area Network (CAN) XL transceiver mode switch message received over a first receive data signal on a CAN XL network to a first transceiver. At 1104, the process 1100 can comprise in response to determining the transceiver mode, routing, by the device, a second CAN XL transceiver mode switch message over a second receive data signal to a second transceiver.

Figure 12:
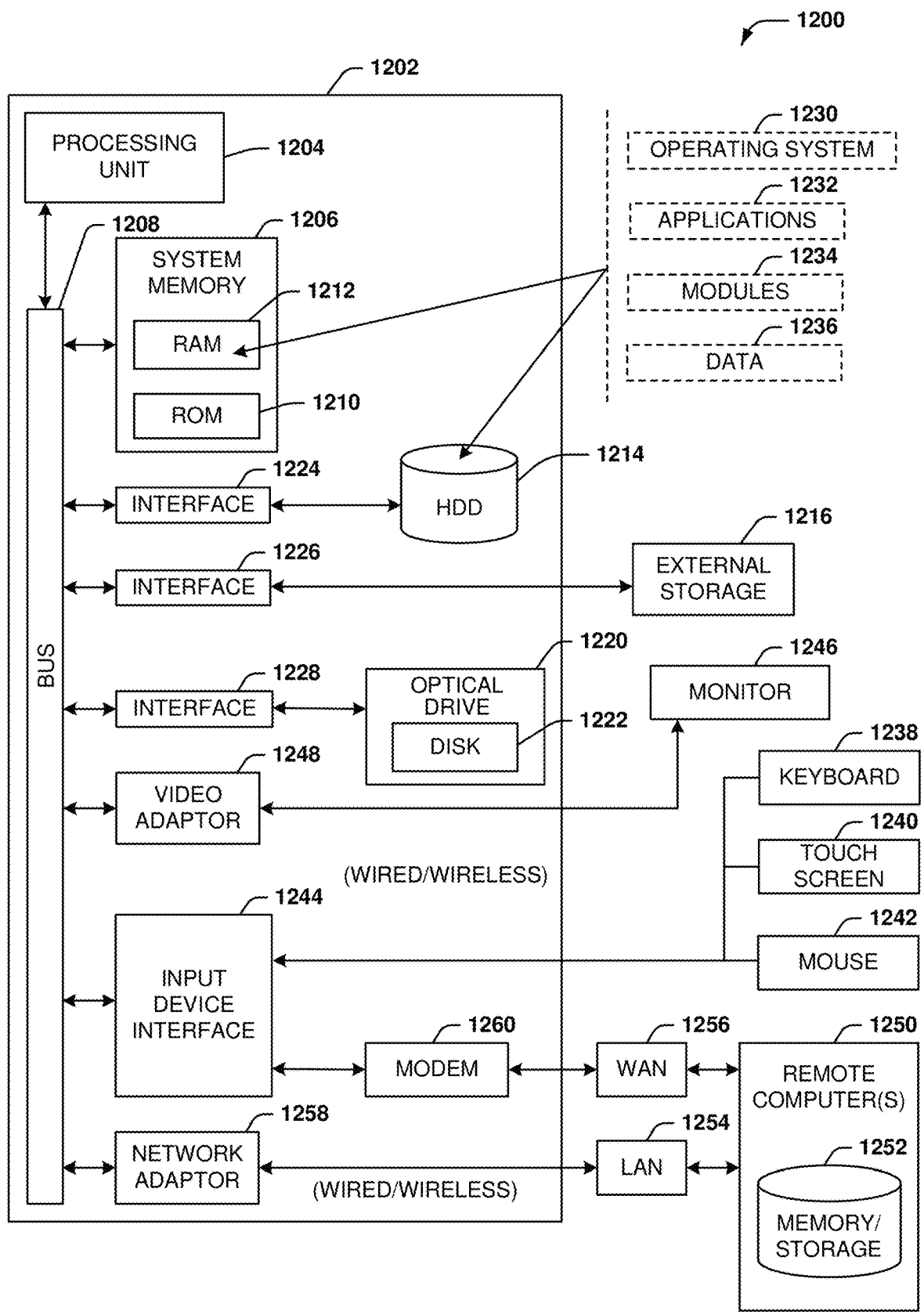
FIG. 12 is an example, non-limiting computing environment in which one or more embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
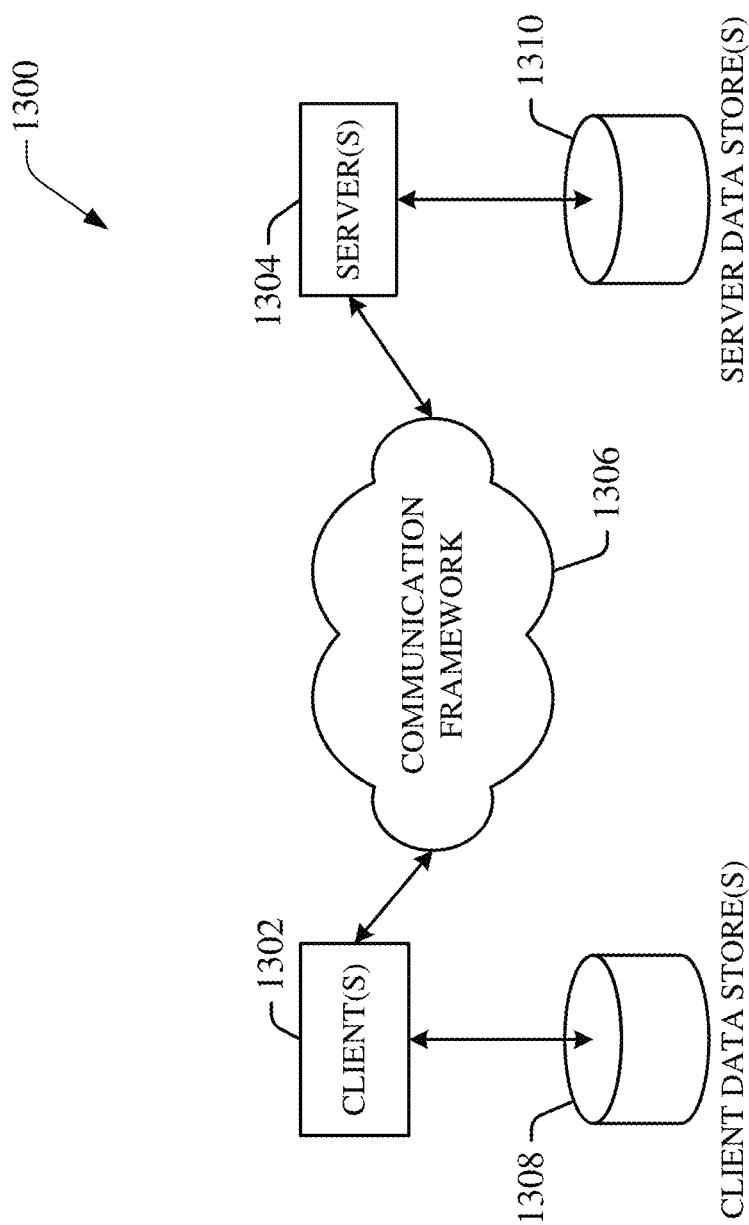
FIG. 13 is an example, non-limiting networking environment in which one or more embodiments described herein can be implemented.

Referring now to FIG. 13, there is illustrated a schematic block diagram of a computing environment 1300 in accordance with this specification. The system 1300 includes one or more client(s) 1302, (e.g., computers, smart phones, tablets, cameras, PDA's). The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform transformations of media items by employing aspects of this disclosure, for example. One possible communication between a client 1302 and a server 1304 can be in the form of a data packet adapted to be transmitted between two or more computer processes wherein data packets may include coded analyzed headspaces and/or input. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one exemplary implementation, a client 1302 can transfer an encoded file, (e.g., encoded media item), to server 1304. Server 1304 can store the file, decode the file, or transmit the file to another client 1302. It is noted that a client 1302 can also transfer uncompressed file to a server 1304 and server 1304 can compress the file and/or transform the file in accordance with this disclosure. Likewise, server 1304 can encode information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A method, comprising:
   determining, by a device comprising a processor, a transceiver mode based on a first Controller Area Network (CAN) XL transceiver mode switch message received over a first receive data signal on a CAN XL network to a first transceiver; and
   in response to determining the transceiver mode, routing, by the device, a second CAN XL transceiver mode switch message over a second receive data signal to a second transceiver.

2. The method of any preceding clause, further comprising:
   in response to determining the transceiver mode, routing, by the device, a third CAN XL transceiver mode switch message over a third receive data signal to a third transceiver.

3. The method of any preceding clause, wherein the first CAN XL transceiver mode switch message comprises a command to switch from an asymmetric arbitration mode to a symmetric data receive mode.

4. The method of any preceding clause, wherein the second CAN XL transceiver mode switch message comprises a command to switch from an asymmetric arbitration mode to a symmetric data transmit mode.

5. The method of any preceding clause, wherein the first CAN XL transceiver mode switch message comprises a command to switch from a symmetric data receive mode or a symmetric data transmit mode to an asymmetric arbitration mode and the second CAN XL transceiver mode switch message comprises the switch from the symmetric data receive mode or the symmetric data transmit mode to the asymmetric arbitration mode.

6. The method of any preceding clause, wherein the second CAN XL transceiver mode switch message is sent within a defined period of time following reception of the first transceiver mode switch message.

7. The method of any preceding clause, wherein the first receive data signal and the second receive data signal comprise bidirectional receive data signals.

8. The method any preceding clause, wherein the first transceiver and the second transceiver each comprise CAN XL transceivers.

9. The method of any preceding clause, wherein message routing is facilitated by a router of the device and a protocol controller of the device.

10. The method of clause 1 above with any set of combinations of clauses 2-9 above.

11. A monitoring device, comprising:
a memory;
a processor operatively coupled to the memory and comprising computer executable components comprising:
a protocol controller that determines a transceiver mode based on a first Controller Area Network (CAN) XL transceiver mode switch message received over a first receive data signal on a CAN XL network to a first transceiver; and
a router that, in response to the protocol controller determining the transceiver mode, routes a second CAN XL transceiver mode switch message over a second receive data signal to a second transceiver.

12. The monitoring device of any preceding clause, wherein in response to the protocol controller determining the transceiver mode, the router routes a third CAN XL transceiver mode switch message over a third receive data signal to a third transceiver.

13. The monitoring device of any preceding clause, wherein the first CAN XL transceiver mode switch message comprises a command to switch from an asymmetric arbitration mode to a symmetric data receive mode.

14. The monitoring device of any preceding clause, wherein the second CAN XL transceiver mode switch message comprises a command to switch from an asymmetric arbitration mode to a symmetric data transmit mode.

15. The monitoring device of any preceding clause, wherein the first CAN XL transceiver mode switch message comprises a command to switch from a symmetric data receive mode or a symmetric data transmit mode to an asymmetric arbitration mode and the second CAN XL transceiver mode switch message comprises the command to switch from the symmetric data receive mode or the symmetric data transmit mode to the asymmetric arbitration mode.

16. The monitoring device of any preceding clause, wherein the first receive data signal and the second receive data signal comprise bidirectional receive data signals.

17. The monitoring device of any preceding clause, wherein the protocol controller comprises a single protocol controller, and wherein the protocol controller is communicatively coupled to the router.

18. The monitoring device of any preceding clause, wherein the protocol controller comprises a group of protocol controllers each communicably coupled to a CAN XL transceiver of a group of CAN XL transceivers of the monitoring device.

19. The monitoring device of clause 11 above with any set of combinations of clauses 12-18 above.

20. A non-transitory machine-readable medium, comprising executable instructions that, when executed by a processor, facilitate performance of operations, comprising:
determining a first transceiver mode based on a first CAN XL transceiver mode switch message received over a first receive data signal to a first transceiver; and
in response to determining the transceiver mode, routing a second CAN XL transceiver mode switch message over a second receive data signal to a second transceiver.

21. The non-transitory machine-readable medium of any preceding clause, wherein the first receive data signal and the second receive data signal comprise bidirectional receive data signals.

22. The non-transitory machine-readable medium of any preceding clause, wherein the first transceiver and the second transceiver each comprise CAN XL transceivers.

23. The non-transitory machine-readable medium of clause 20 above with any set of combinations of clauses 21-22 above.

What is claimed is:

1. A method, comprising:
detecting, by a router of a controller area network (CAN) monitoring device comprising a processor, during an arbitration phase, a first CAN XL transceiver mode switch message being sent over a first receive data signal to a first transceiver of the CAN monitoring device, wherein the first CAN XL transceiver mode switch message is associated with a first CAN XL frame sent from a first CAN XL node on a CAN XL network to the first transceiver, wherein the CAN monitoring device further comprises a group of transceivers respectively coupled to different CAN XL nodes of a group of CAN XL nodes comprising the first CAN XL node, wherein the group of transceivers comprise the first transceiver, and wherein the first CAN XL transceiver mode switch message causes the first transceiver to switch from an asymmetric arbitration mode to a symmetric data receive mode; and
in response to the detecting, sending, by the router of the CAN monitoring device, a second CAN XL transceiver mode switch message over a second receive data signal to a second transceiver of the group of transceivers of the CAN monitoring device, wherein the second CAN XL transceiver mode switch message causes the second transceiver to switch from the asymmetric arbitration mode to a symmetric data transmit mode.

2. The method of claim 1, further comprising:
sending, by the router of the CAN monitoring device, a third CAN XL transceiver mode switch message over a third receive data signal to a third transceiver of the group of transceivers of the CAN XL monitoring device, wherein the third CAN XL transceiver mode switch message causes the third transceiver to switch from the asymmetric arbitration mode to the symmetric data transmit mode.

3. The method of claim 1, wherein the third CAN XL transceiver mode switch message is sent concurrently with the second CAN XL transceiver mode switch message.

4. The method of claim 1, wherein the second CAN XL transceiver mode switch message is sent concurrently with the first CAN XL transceiver mode switch message.

5. The method of claim 1, detecting, by the router of the CAN monitoring device, a third CAN XL transceiver mode switch message being sent over the first receive data signal to the first transceiver, wherein the third CAN XL transceiver mode switch message causes the first transceiver to switch from the symmetric data receive mode to the asymmetric arbitration mode.

6. The method of claim 5, sending, by the router of the CAN monitoring device, a fourth CAN XL transceiver mode switch message over the second receive data signal to the second transceiver, wherein the second CAN XL transceiver mode switch message causes the second transceiver to switch from the symmetric data transmit mode to the asymmetric arbitration mode.

7. The method of claim 1, wherein the first receive data signal and the second receive data signal comprise bidirectional receive data signals.

8. The method of claim 6, sending, by the router of the CAN monitoring device, concurrently with sending the fourth CAN XL transceiver mode switch message, a fifth CAN XL transceiver mode switch message over the third receive data signal to the third transceiver, wherein the fifth CAN XL transceiver mode switch message causes the third transceiver to switch from the symmetric data transmit mode to the asymmetric arbitration mode.

9. The method of claim 1, wherein the first CAN XL transceiver mode switch message is being sent by a protocol controller of the CAN XL monitoring device.

10. A controller area network (CAN) monitoring device, comprising:
a group of transceivers;
a memory;
a processor operatively coupled to the memory and comprising computer executable components comprising:
a protocol controller that sends, during an arbitration phase, a first CAN XL transceiver mode switch message to a first transceiver of the group of transceivers, wherein the first CAN XL transceiver mode switch message is associated with a first CAN XL frame sent from a first CAN XL node on a CAN XL network to the first transceiver, wherein the group of transceivers are respectively coupled to different CAN XL nodes of a group of CAN XL nodes comprising the first CAN XL node, and wherein the first CAN XL transceiver mode switch message causes the first transceiver to switch from an asymmetric arbitration mode to a symmetric data receive mode; and
a router that, in response to detecting the first CAN XL transceiver mode switch message being sent, sends a second CAN XL transceiver mode switch message over a second receive data signal to a second transceiver of the group of transceivers of the CAN monitoring device, wherein the second CAN XL transceiver mode switch message causes the second transceiver to switch from the asymmetric arbitration mode to a symmetric data transmit mode.

11. The monitoring device of claim 10, wherein the router sends a third CAN XL transceiver mode switch message over a third receive data signal to a third transceiver of the group of transceivers of the CAN XL monitoring device, wherein the third CAN XL transceiver mode switch message causes the third transceiver to switch from the asymmetric arbitration mode to the symmetric data transmit mode.

12. The monitoring device of claim 10, wherein router:
intercepts the first CAN XL transceiver mode switch message,
sends the first CAN XL transceiver mode switch message to the first transceiver, and
sends the second CAN XL transceiver mode switch message to the second transceiver concurrently with sending the first CAN XL transceiver mode switch message.

13. The monitoring device of claim 10, wherein the third CAN XL transceiver mode switch message is sent concurrently with the second CAN XL transceiver mode switch message.

14. The monitoring device of claim 10, wherein the router detects a a third CAN XL transceiver mode switch message being sent over the first receive data signal to the first transceiver, wherein the third CAN XL transceiver mode switch message causes the first transceiver to switch from the symmetric data receive mode to the asymmetric arbitration mode.

15. The monitoring device of claim 10, wherein the router sends a fourth CAN XL transceiver mode switch message over the second receive data signal to the second transceiver, wherein the second CAN XL transceiver mode switch message causes the second transceiver to switch from the symmetric data transmit mode to the asymmetric arbitration mode.

16. The monitoring device of claim 15, wherein the router sends, concurrently with sending the fourth CAN XL transceiver mode switch message, a fifth CAN XL transceiver mode switch message over the third receive data signal to the third transceiver, wherein the fifth CAN XL transceiver mode switch message causes the third transceiver to switch from the symmetric data transmit mode to the asymmetric arbitration mode.

17. The monitoring device of claim 10, wherein the protocol controller comprises a group of protocol controllers each communicably coupled to a different transceiver of the group of transceivers of the monitoring device.

18. A non-transitory machine-readable medium, comprising executable instructions that, when executed by a processor of a controller area network (CAN) monitoring device, facilitate performance of operations, comprising:
detecting, by a router of the CAN monitoring device, during an arbitration phase, a first CAN XL transceiver mode switch message being sent over a first receive data signal to a first transceiver of the CAN monitoring device, wherein the first CAN XL transceiver mode switch message is associated with a first CAN XL frame sent from a first CAN XL node on a CAN XL network to the first transceiver, wherein the CAN monitoring device further comprises a group of transceivers respectively coupled to different CAN XL nodes of a group of CAN XL nodes comprising the first CAN XL node, wherein the group of transceivers comprise the first transceiver, and wherein the first CAN XL transceiver mode switch message causes the first transceiver to switch from an asymmetric arbitration mode to a symmetric data receive mode; and
in response to the detecting, sending, by the router of the CAN monitoring device, a second CAN XL transceiver mode switch message over a second receive data signal to a second transceiver of the group of transceivers of the CAN monitoring device, wherein the second CAN XL transceiver mode switch message causes the second transceiver to switch from the asymmetric arbitration mode to a symmetric data transmit mode.

19. The non-transitory machine-readable medium of claim 18, wherein the operations further comprise sending, by the router of the CAN monitoring device, a third CAN XL transceiver mode switch message over a third receive data signal to a third transceiver of the group of transceivers of the CAN XL monitoring device, wherein the third CAN XL transceiver mode switch message causes the third transceiver to switch from the asymmetric arbitration mode to the symmetric data transmit mode.

20. The non-transitory machine-readable medium of claim 18, wherein the third CAN XL transceiver mode switch message is sent concurrently with the second CAN XL transceiver mode switch message.

\* \* \* \* \*